A. J. WILEY.
METAL FLUME.
APPLICATION FILED APR. 19, 1911.
1,019,870.
Patented Mar. 12, 1912.
2 SHEETS—SHEET 2.
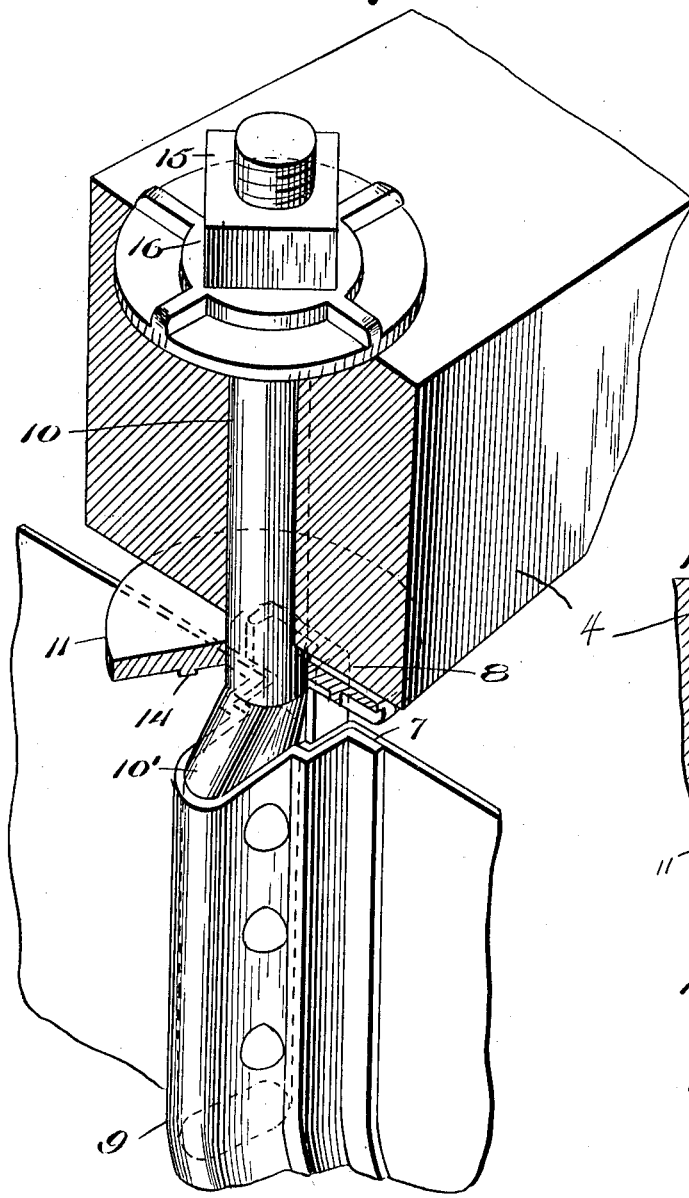
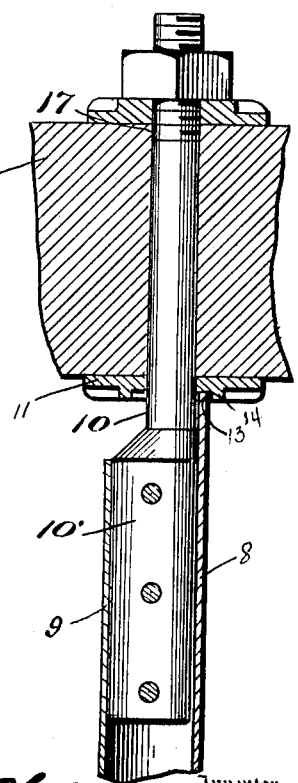

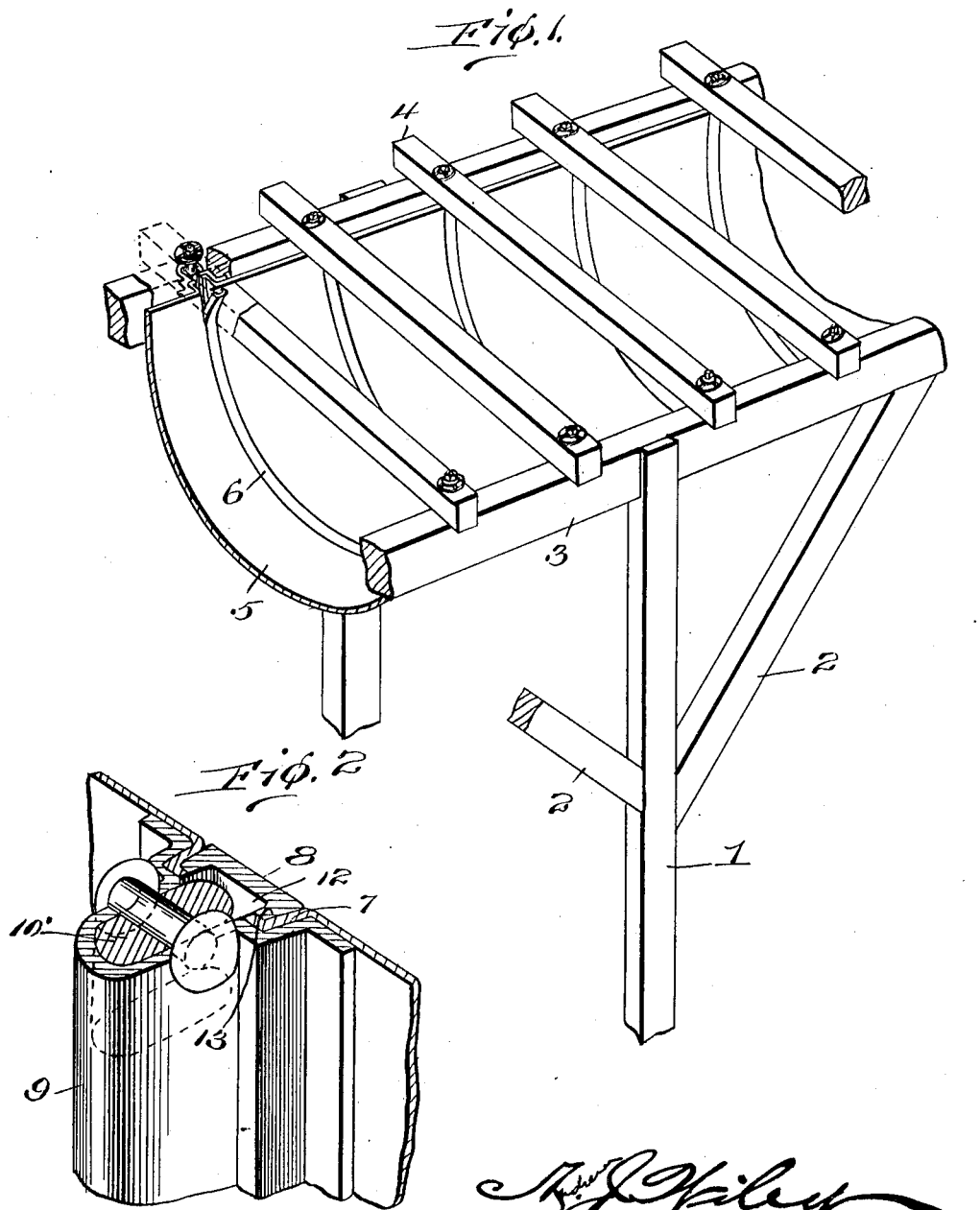

UNITED STATES PATENT OFFICE.

ANDREW J. WILEY, OF BOISE, IDAHO.

METAL FLUME.

1,019,870. Specification of Letters Patent. Patented Mar. 12, 1912.

Application filed April 19, 1911. Serial No. 622,083.

*To all whom it may concern:*

Be it known that I, ANDREW J. WILEY, a citizen of the United States, residing at Boise, in the county of Ada and State of Idaho, have invented certain new and useful Improvements in Metal Flumes, of which the following is a specification.

My invention relates to improvements in metal flumes and has particular reference to a metal flume designed for conveying water for irrigation, power, or other purposes in which a curved metal shell serves as the carrying channel.

More particularly my invention refers to the joint between the successive curved sections, which when joined together make the continuous flume forming the channel.

One object of my invention is the provision of a water-tight joint for use in the above-mentioned connection which will obviate the use of rivets or bolts.

Another object of my invention is the provision of a joint which will allow for the expansion and contraction due to variations of temperature.

Another object of my invention is to provide a joint which will possess a certain amount of flexibility and yet retain a degree of lateral stiffness sufficient to withstand any sudden strain imposed upon the structure.

A further object of my invention is the provision of a joint which will have a smooth interior surface free from projections in order to reduce friction and give the flume or main a high discharge capacity.

To attain the above-mentioned objects my invention resides in the provision of a flume of the character and for the purpose specified which will be of novel construction and combination of parts for service substantially as disclosed herein.

Figure 1 is a perspective view of a portion of the assembled flume in position upon a frame work or trestle of any desired construction showing in section one of my improved joints. Fig. 2 is a detail view of one of my joints, showing its essential elements. Fig. 3 is a sectional view of my joint in position upon the supporting structure showing in particular the reinforcing rib and threaded lug, and Fig. 4 is a front view of the joint and locking means.

Referring by numeral to the drawings in which similar numerals denote corresponding parts in all the views: The numeral 1 designates the vertical standards or supporting members of the frame work and trestle upon which my flume is mounted, 2 the arms or braces for said supports, 3 the sills or side pieces of the trestle, 4 the cross ties to which my flume is secured, 5 the sections of curved metal sheets of any convenient length or curvature, 7 the flanged edges, 8 the channel strip and 9 the rib. The channel strip 8 and rib 9 are rolled to the same curvature.

The threaded lug 10 is provided with the head 10′, attached to each end of the rib 9 and the washer 11 is placed on said threaded lug 10 as shown in Figs. 3 and 4, and the rib 9 is swung from the support 4 by means of said lugs 10 at each end. In assembling the parts of the flume I place the flanged edges 7 of the sheets to be connected in the ribs in the position assumed in Figs. 2, 3 and 4. The channel strip 8 is then inserted in the groove 12 between the flanged ends 7 of the curved sections 5 with the ends 13 of said channel strip 8 resting against the rib or projection 14 in the base of the washer 11. The joint is then made by forcing the channel strip 8 into the said groove 12 between the flanged ends of the shell by means of the securing member 15 and the washer 16 resting on the support or cross tie 4, said securing member 15 having threads engaging with the threads 17 of the lug 10, thus gradually compressing the flanges 7 between the channel strip 8 and rib 9.

It will be seen that the flume is reinforced at every joint by the peculiar construction of the rib 9, possessing as it does a considerable depth and affording the greatest possible resistance to bending or deformation owing to the weight of the metal used. It will also be apparent that by making the moment of bending on either side of the rib somewhat less than the safe working strength of the shell the opening or closing of the sides of the rib due to expansion and contraction would safely and surely provide for changes of length in the shell at every joint, due to variations of temperature. Furthermore it is evident that when the channel strip 8 is forced into its seat it completely fills the groove between the two sections of the shell, thus leaving a smooth surface on the interior absolutely free from projections or obstructions to impede the discharge capacity of the flume, and thereby reducing the coefficient of roughness or friction materially.

From the foregoing it is obvious that I have accomplished the desiderata already mentioned, since I have provided a watertight joint; a joint having both flexibility and lateral stiffness; a joint affording an unobstructed interior surface to the passage of the water; a joint which effectually provides for the expansion and contraction due to variations of temperature; and finally a joint which is inexpensive of production and thoroughly practical and efficient in every particular.

I claim:

1. In a flume for conveying water, the combination with the supporting structure, of a thin metal shell, consisting of independently curved sections with expansion joints on the exterior of said shell between each section.

2. In a flume for conveying water, the combination with the supporting structure, of a thin metal shell, consisting of independently curved sections having flanges of any desired shape fitting into and connected by a rib of curved shape on the exterior of said metal shell, said rib having threaded lugs attached thereto for securing the joint to the framework and being closed by a tongue of proper shape and material to completely fill the space between the flanges of the shell.

3. In a flume for conveying water, the combination with the supporting structure, of a thin metal shell, consisting of independently curved sections having flanges of any desired shape fitting into and connected by a rib of curved shape on the exterior of said metal shell, said ribs being closed by a tongue of proper shape and material to completely fill the space between the flanged ends of the shell.

4. In a flume for conveying water, the combination with the supporting structure, of a thin metal shell, consisting of independently curved sections having flanges of any desired shape fitting into and connected by a rib of curved shape on the exterior of said metal shell, said ribs being closed by a tongue of proper shape and material to completely fill the space between the flanged ends of the shell, said tongue or channel strip being rolled to the proper curvature to coincide with that of the said ribs.

5. In a flume for conveying water, the combination with the supporting structure, of a thin metal shell of independently curved sections having flanges of any desired shape fitting into and connected by a rib of curved shape to the exterior of the shell, a channel strip or tongue fitting in said rib, said rib having threaded lugs attached at each end whereby a joint is made through the medium of a locking nut or member secured to the supporting framework washers secured to said lugs and having ribs or projections on their bases against which rest the edges of the channel strip or tongue serving to close said ribs to completely fill the space between the flanged ends of the shell.

6. A flume, consisting of a series of curved sections having a channel at their opposing ends, a tongue fitting in said channel and means connecting the ends of the sections and securing the tongues in place, said means consisting of a curved rib having threaded lugs provided with washers having ribs or projections thereon against which the edges of the channel strip or tongue rest, and having nuts for securing the sections of the shell to the framework.

7. A flume, consisting of a series of sections having flanges at each end, tongues fitting between the flanges, and a means on the exterior of the ends of the sections for connecting the sections and securing the tongues between the ends, said means consisting of a curved rib having threaded lugs provided with washers having ribs or projections thereon against which the edges of the channel strip or tongue rest, and having nuts for securing the sections of the shell to the framework.

8. A flume, consisting of a series of curved sections having angle shaped flanges at their ends, tongues fitting in said flanges on the interior, and means engaging the exterior of said flanged ends of the sections, said means consisting of a curved rib having threaded lugs provided with washers having ribs or projections thereon against which the edges of the channel strip or tongue rest, and having nuts for securing the sections of the shell to the framework.

In testimony whereof I affix my signature in presence of two witnesses.

ANDREW J. WILEY.

Witnesses:
WALTER S. BRUCE,
SIDNEY C. FULD.

---

Copies of this patent may be obtained for five cents each, by addressing the "Commissioner of Patents, Washington, D. C."